United States Patent Office 3,254,098
Patented May 31, 1966

3,254,098
PROCESS FOR THE PRODUCTION OF 19 NOR-ANDROSTANES AND 19 NOR-PREGNANES
John Edwards, Mexico City, Mexico, assignor to Syntex Corporation, Panama, Panama, a corporation of Panama
No Drawing. Filed Feb. 20, 1964, Ser. No. 346,111
7 Claims. (Cl. 260—397.3)

The present invention relates to a new process for making certain cyclopentanophenanthrene derivatives.

More particularly the present invention relates to a new process for making steroid compounds of the 19-nor-androstane and 19-nor-pregnane series with abnormal configuration at the centers of asymmetry of the steroidal skeleton, particularly at carbon atoms 9 and 10.

The transformation of the normal steroid configuration of 19-nor steroids into the $9\beta$ or $9\beta,10\alpha$-configuration was found to have a remarkable effect on the physiological properties of the compounds in comparison with those of the normal $9\alpha,10\beta$-series. For example, in the 19-nor androstane series, $9\beta$-testosterone, $9\beta,10\alpha$-testosterone or the alkyl derivatives thereof are anabolic, androgenic agents with a favorable anabolic/androgenic ratio. They are pituitary inhibitors, anti-estrogenic and lower cholesterol level in blood.

The derivatives of the 19-nor-pregnan series are progestational agents with oral activity and those that have the dihydroxy acetone side chain and an oxygenated function at C-11 are valuable cortical hormones with high anti-inflammatory, glycogenic and thymolytic activities.

In accordance with the present invention the surprising discovery has been made that when a 3-keto-$\Delta^{9(11)}$-19-nor-$5\beta$-androstene (etiocholene) or pregnene derivative is hydrogenated in the presence of a heavy metal catalyst, preferably using platinum oxide as catalyst, the products obtained have the hydrogen atom at C-9 in $\beta$-configuration, as illustrated by the following equation, wherein only rings A, B, and C of the steroid molecule are represented:

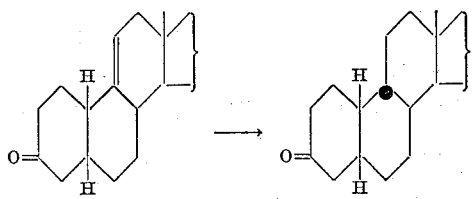

Suitable solvents are the lower hydrocarbon carboxylic acids and its esters such as acetic acid, ethyl acetate, and the like. This hydrogenation may also be effected using a palladium catalyst, such as for example 5 or 10% palladium on charcoal, preferably in ethyl acetate as solvent.

The reaction is carried out generally at room temperature and atmospheric pressure, however, variation in temperature, pressure and catalyst do not affect the course of the reaction. In the case that platinum oxide is used as catalyst, it is advisable to treat the hydrogenation product with chromium trioxide, since the keto groups present might be partially reduced.

This method for obtaining inversion of configuration at C-9 may be applied to a great variety of starting materials; at C-17 there may be present a ketone, a $17\beta$-hydroxy or acyloxy group, a $17\beta$-acetyl group with or without a hydroxy or acyloxy group at C-$17\alpha$ or the dihydroxy acetone side chain protected as the bismethylenedioxy derivative. In addition, other substituents may be present at different positions of the steroid molecule, such as for example, methyl groups at C-1, 2, 4, 6, 7, 16 or 17; in the pregnane series a $16\alpha$, $17a$-diol moiety protected as the acetonide, etc.

The method for making 19-nor-$9\beta,10\alpha$-androstane derivatives is illustrated by the following sequence of reactions:

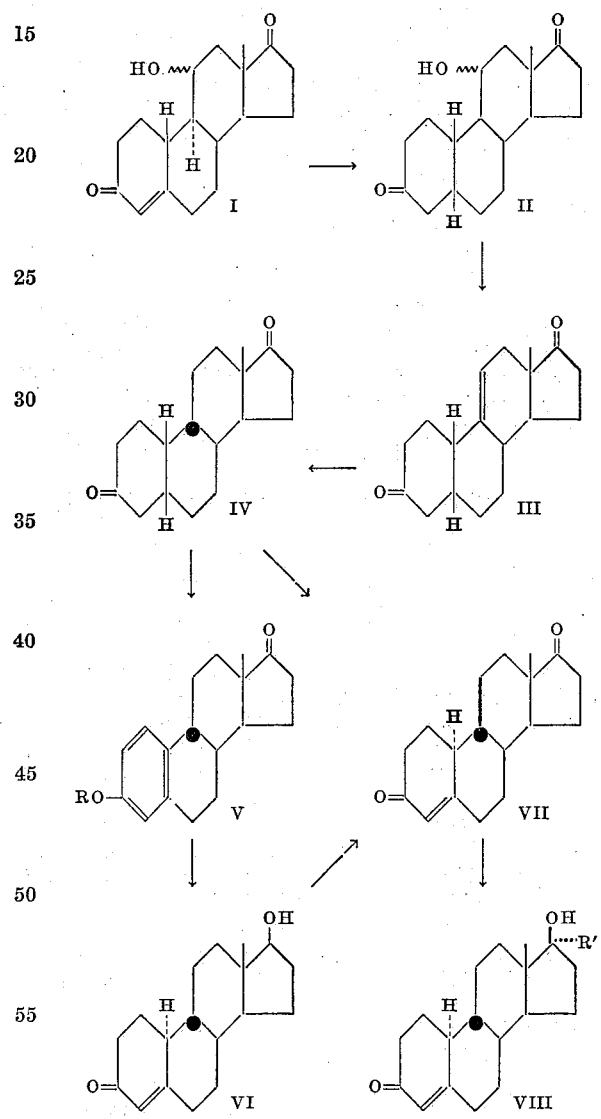

In the above formulas, R represents hydrogen or methyl and $R^1$ represents a lower alkyl, alkenyl or alkinyl group. The wavy line at C-11 represents the $\alpha$ or $\beta$ configuration for the hydroxyl group at said position.

In practicing the process outlined above, the starting materials 19-nor-Δ⁴-androsten-11α-ol-3,17-dione, or 19-nor-Δ⁴-androsten-11β-ol-3,7-dione (I), obtained respectively by incubation of 19-nor-Δ⁴-androstene-3,17-dione with *Rhizopus nigricans*, or *Curvularia lunata*, are hydrogenated under alkaline conditions in the presence of a palladium catalyst and using a lower aliphatic alcohol as solvent, to produce 11α-hydroxy-19-nor-etiocholane-3,17-dione or 11β-hydroxy-19-nor-etiocholane-3,17-dione (II). This hydrogenation is conducted in the presence of a small amount of sodium or potasisum hydroxide or in the presence of an organic base such as piperidine.

Upon dehydration of these saturated compounds with an α-fluorinated amine, such as for example with 2-chloro-1,1,2-trifluorotriethylamine or 1,1,2,2-tetrafluoroethyldimethylamine in a solvent without acidic hydrogen such as diethylether, isopropylether, dioxane, tetrahydrofuran, methylene chloride, etc., there is produced Δ⁹⁽¹¹⁾-19-nor-etiocholene-3,17-dione (III).

Alternatively, this reaction may be effected by treatment with mesyl chloride in dimethylformamide or through the 11-sulfonate.

Catalytic hydrogenation of the double bond of the latter compound in the presence of platinum oxide as catalyst in acetic acid or ethyl acetate solution followed by oxidation with chromic acid, preferably with 8 N-chromic acid in acetone solution (Jones' reagent) gives rise to the saturated compound having abnormal configuration at C–9, i.e.. 19-nor-9β-etiocholane-3,17-dione (IV). When this hydrogenation is effected in the presence of a palladium on charcoal catalyst, in ethyl acetate solution, the oxidation step is omitted.

By incubation of 19-nor-9β-etiocholane-3,17-dione with a culture of *Corynebacterium simplex* in a suitable nutrient medium containing carbohydrates, organic nitrogen, cofactors and inorganic salts for a period of time of between 10 to 24 hours, preferably for about 16 hours under aeration and at a temperature of between 32 and 37° C., there is obtained the aromatization of ring A, thus producing 19-nor-9β-estrone (V; R=H) which is converted into its 3-methyl ether (V; R=Me) by conventional methods, preferably by treatment with dimethyl sulfate in acetone solution, in the presence of potassium hydroxide.

The aromatization of ring A can be also achieved by chemical methods, such as for example by bromination at C–4 followed by dehydrobromination to produce Δ⁴-19-nor-9β-androstene-3,17-dione which upon dehydrogenation with selenium dioxide or 2,3-dichloro-5,6-dicyano-1,4-benzoquinone (D.D.Q.) give rise to the ring A aromatic compound (V; R=H). In addition by direct treatment of 19 - nor - 9β-etiocholane-3,17-dione with D.D.Q. in dioxane solution, at reflux temperature, there is produced a mixture of Δ⁴-19-nor-9β-androstene-3,17-dione and Δ¹-19-nor-9β-androstene-3,17-dione, which is separated by chromatography. Upon reflux of Δ⁴-19-nor-9β-androstene-3,17-dione with dilute sodium or potassium hydroxide solution in methanol, the steric configuration of the hydrogen atom at C–10 is inverted, thus producing Δ⁴-19-nor-9β,10α-androstene-3,17-dione (VII).

Reduction of V(R=methyl) with lithium in liquid ammonia produces 3-methoxy-Δ²,⁵⁽¹⁰⁾-19-nor-9β-androstadien-17β-ol, which upon treatment with acid, preferably with 3 N-hydrocholric acid in methanol solution affords 19-nor-9β,10α-testosterone (VI). Oxidation of this compound with Jones' reagent produces Δ⁴-19-nor-9β,10α-androstene-3,17-dione (VII).

In order to obtain the 17α-substituted compounds (VIII; R¹=alkyl, alkenyl, alkinyl) the 3-keto group of the preceding dione is protected by enol ether formation and the 3-ethoxy compound mixture of Δ³,⁵- and Δ³,⁵⁽¹⁰⁾-isomers is reacted with a hydrocarbon magnesium halide or the sodium or potassium salt of a lower alkine followed by hydrolysis of the protecting group.

The 19-nor-9β,10α-progesterone derivatives are obtained by the method illustrated by the following sequence of reactions:

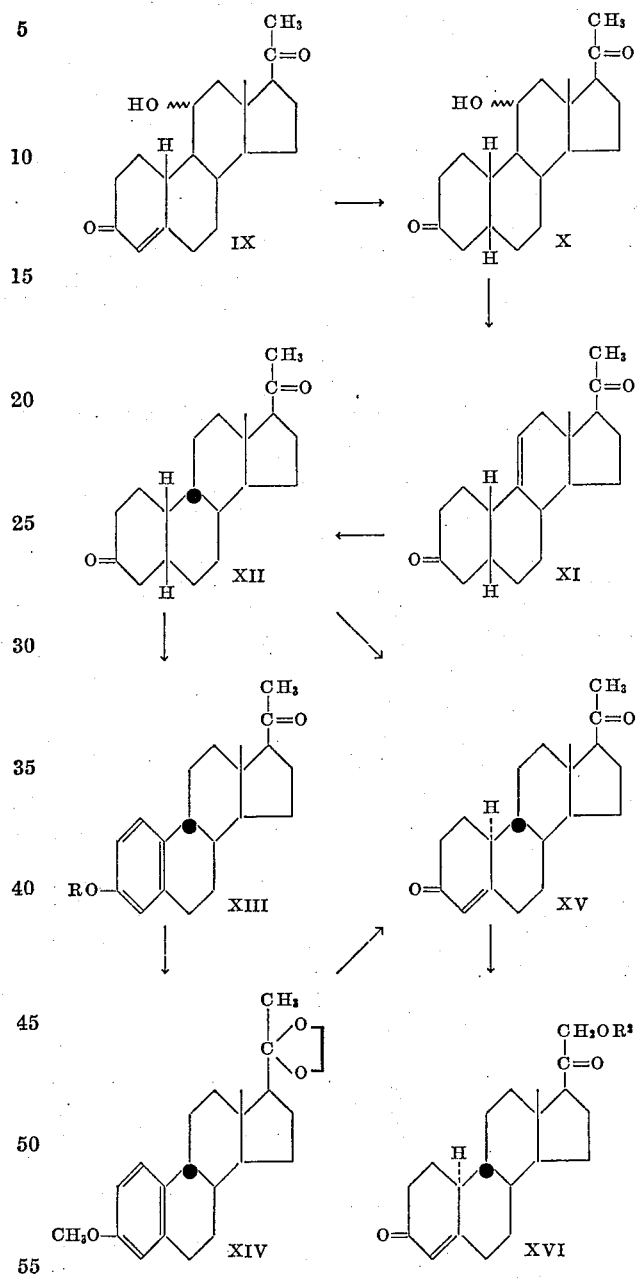

In the above formulas, R has the same meanings as heretofore set forth and R² represents hydrogen or the acyl group of a hydrocarbon carboxylic acid of less than 12 carbon atoms. The wavy line at C–11 represents the α or β configuration for the hydroxyl group.

In practicing the process outlined above, 11α-hydroxy-19-nor-progesterone or 11β-hydroxy-19-nor-progesterone (IX) are hydrogenated under alkaline conditions to produce 19-nor-pregnan-11α-ol-3,20-dione or 19-nor-pregnan-11β-ol-3,20-dione (X) which upon dehydration with an α-fluorinated amine or with mesyl chloride in dimethylformamide produce Δ⁹⁽¹¹⁾ - 19 - nor - pregnene-3,20-dione (XI). Hydrogenation of this compound in the presence of platinum oxide as catalyst in acetic acid or ethyl acetate solution followed by treatment with chromic acid in acetone solution affords 19-nor-9β-pregnane-3,20-dione (XII).

Upon reflux of the latter compound with 2,3-dichloro-5,6-dicyano-1,4-benzoquinone in dioxane solution there is produced a mixture of 19-nor-9β-progesterone and Δ¹-

19-nor-9β-pregnene-3,20-dione, which is separated by chromatography. By treatment of 19-nor-9β-progesterone with methanolic potassium hydroxide solution, there is produced 19-nor-9β,10α-progesterone (XV).

Alternatively, microbiological dehydrogenation of 19-nor-9β-pregnane-3,20-dione (XII) with *Corynebacterium simplex*, as described for the androstane series gives rise to the aromatic compound (XIII; R=H) which is converted into its methyl ether, namely 3-methoxy-$\Delta^{1,3,5(10)}$-19-nor-9β-pregnatrien-20-one (XIII; R=CH$_3$) by conventional reaction with dimethyl sulfate. This compound is then converted into its 20-ketal (XIV) by treatment with ethylene glycol in benzene solution and in the presence of p-toluenesulfonic acid, and then reduced with lithium in liquid ammonia followed by treatment with acid, to produce 19-nor-9β,10α-progesterone. Acetoxylation at C-21 of this compound by the method of Ringold et al. [J. Am. Chem. Soc. 80, 250 (1958)], produces the acetate of 19-nor-9β,10α-desoxycorticosterone (XVI; R$^2$=acetyl). By conventional saponification there is produced the free compound (XVI; R$^2$=H) which can be reesterified with acid anhydrides or acid chlorides of less than 12 carbon atoms in pyridine solution.

The above described process may also be applied to 17,20;20,21 - bismethylenedioxy - $\Delta^4$ - 19 - nor - pregnen-11β-ol-3-one, or the 11α-hydroxy isomer as starting materials, which are hydrogenated under alkaline conditions to produce 17,20;20,21 - bismethylenedioxy - 19 - nor-pregnan - 11β - ol - 3 - one or 17,20;20,21 - bismethylenedioxy - 19 - nor - pregnan - 11α - ol - 3 - one. Dehydration of these compounds with an α-fluorinated amine or mesyl chloride in dimethylformamide solution afford 17,20;20,21 - bismethylenedioxy - $\Delta^{9(11)}$ - 19 - nor-pregnen-3-one, which is then hydrogenated in the presence of platinum oxide catalyst in acetic acid or ethyl acetate solution, followed by treatment with chromic acid, or using 10% palladium charcoal catalyst, to produce 17,20;20,21-bismethylenedioxy-19-nor-9β-pregnan-3-one.

Aromatization of ring A of the preceding compound by incubation with a culture of *Corynebacterium simplex* followed by etherification of the phenolic hydroxyl group with methyl sulfate yields 3-methoxy-17,20;20,21-bismethylenedioxy-$\Delta^{1,3,5(10)}$-pregnatriene. Lithium in liquid ammonia reduction of this compound followed by treatment with 3 N hydrochloric acid give rise to 17,20;20,21-bismethylenedioxy - $\Delta^4$ - 19 - nor - 9β,10α - pregnen - 3-one.

The bismethylenedioxy group is finally hydrolyzed by conventional methods, preferably by reflux with 60% formic acid, to produce $\Delta^4$-19-nor-9β,10α-pregnene-17α,21-diol-3,20-dione.

The following examples serve to illustrate but are not intended to limit the scope of the invention:

Example I

A solution of 5 g. of 19-nor-$\Delta^4$-androsten-11α-ol-3,17-dione obtained by incubation of 19-nor-$\Delta^4$-androstene-3,17-dione with a culture of *Rhizopus nigricans*, by following the method of S. H. Eppstein et al., J. Am. Chem. Soc. 75, 408 (1953), in 300 cc. of a 1% ethanolic potassium hydroxide solution was added to 1.5 g. of 5% palladium on charcoal catalyst suspended in 10 cc. of ethanol, which had been previously reduced. The mixture was hydrogenated at approximately 25° C. at atmospheric pressure until the absorption of hydrogen ceased. The catalyst was eliminated by filtration, and the filtrate concentrated to a small volume under reduced pressure. Water was added to precipitation and the product was extracted with methylene chloride. The extract was washed with water, dried over anhydrous sodium sulfate and evaporated to dryness under vacuum. Crystallization from acetone-hexane afforded 19-nor-etiocholan-11α-ol-3,17-dione.

To a mixture of 3 g. of the foregoing compound and 200 cc. of anhydrous methylene chloride there was added 3 g. of 2-chloro-1,1,2-trifluorothriethylamine and the reaction mixture was kept at room temperature overnight. It was then evaporated under reduced pressure and the residue crystallized from acetone-ether, thus producing $\Delta^{9(11)}$-19-nor-etiocholene-3,17-dione.

A solution of 2 g. of the latter compound in 100 cc. of acetic acid was hydrogenated using 300 mg. of platinum oxide catalyst previously reduced, at room temperature and atmospheric pressure, until the absorption of hydrogen ceased. After removing the catalyst by filtration, the solvent was evaporated to dryness under vacuum. The residue was dissolved in 20 cc. of acetone, cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0-5° C. and diluted with water. The precipitate was collected, washed with water and dried under vacuum, thus producing 1.8 g. of 19-nor-9β-etiocholane-3,17-dione, which was purified by crystallization from acetone-hexane.

Example II

Portions of 50 cc. of each of the following aqueous solutions: K$_2$HPO$_4$, 1.33% conc.; KH$_2$PO$_4$, 0.4% conc.; and yeast extract, 1% conc. were placed into twenty 250 ml. Erlenmeyer flasks and sterilized at 15 pounds for 15 minutes. The flasks were inoculated with 1 cc. portions of a culture of *Corynebacterium simplex* previously grown for 24 hours in the same culture medium. After 24 hours of growing period under submerged conditions (rotatory shakers, 300 cycles per minute at 28° C.), 5 mg. of 19-nor-9β-etiocholane-3,17-dione were added per flask. The cultures were then incubated for 16 hours under the same conditions. After this time, the cultures were combined and extracted with 6 liters of methylene dichloride. The extract was concentrated at a low temperature under vacuo and the residue was purified by column chromatography and crystallization, thus affording $\Delta^{1,3,5(10)}$-9β-estratrien-3-ol-17-one (9β-estrone), identical to an authentic sample.

Example III

To a suspension of 5 g. of 9β-estrone in 10 cc. of acetone there was added a solution of 14 g. of potassium hydroxide in 7.5 cc. of water and the stirred mixture was treated dropwise with 8 cc. of dimethyl sulfate. The reaction mixture was stirred for 45 minutes further, poured over a dilute solution of hydrochloric acid and the formed precipitate collected by filtration. Crystallization from chloroform-methanol gave the 3-methylether of 9β-estrone.

The preceding compound was dissolved in 500 cc. of anhydrous ether, cooled to $-10°$ C. and added to a stirred solution of 6 g. of lithium metal in 600 cc. of liquid ammonia. The mixture was stirred for 30 minutes further, 100 cc. of absolute methanol were added carefully (until decolorization) and the ammonia was evaporated. It was then diluted with water, extracted with ether and the combined extracts washed with water to neutral, dried and evaporated to dryness. The residue was dissolved in 200 cc. of methanol, 100 cc. of 3 N hydrochloric acid was added and the mixture refluxed for 45 minutes, poured into water, extracted with ethyl acetate and the organic extract washed to neutral, dried and evaporated to dryness. The residue was chromatographed on 225 g. of washed alumina thus giving 19-nor-9β,10α-testosterone.

Example IV

By following the oxidation method described in Example I, 2 g. of 19-nor-9β,10α-testosterone were treated with an 8 N solution of chromic acid in acetone to produce 19-nor-$\Delta^4$-9β,10α-androstene-3,17-dione.

A suspension of 1 g. of the foregoing compound in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried, thus producing a mixture of 3-ethoxy-$\Delta^{3,5}$-19-nor-9$\beta$,10$\alpha$-androstadien - 17 - one and 3 - ethoxy - $\Delta^{3,5(10)}$ - 19 - nor-9$\beta$-androstadien-17-one which was used for the next step without further purification.

Example V

A solution of 1 g. of the mixture of enolethers in 50 cc. of thiophene-free benzene was treated with 6 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness. The solid residue was dissolved in 50 cc. of acetone, treated with 2 cc. of concentrated hydrochloric acid and the mixture stirred at room temperature for 1 hour. It was then poured into water, extracted with methylene chloride and the organic extract washed with water to neutral, dried over anhydrous sodium sulfate and evaporated to dryness. Crystallization from acetone-hexane gave 17$\alpha$-methyl-18-nor-9$\beta$,10$\alpha$-testosterone.

In a similar manner but using ethyl, propyl, vinyl and ethinyl magnesium bromide as reagents there were obtained 17$\alpha$-ethyl-19-nor-9$\beta$,10$\alpha$-testosterone, 17$\alpha$-propyl-19 - nor-9$\beta$,10$\alpha$-testosterone, 17$\alpha$-vinyl-19-nor-9$\beta$,10$\alpha$-testosterone and 17$\alpha$-ethinyl-19-nor-19$\beta$,10$\alpha$-testosterone.

Example VI

A solution of 2 g. of 19-nor-$\Delta^4$-androsten-11$\beta$-ol-3,17-dione, obtained by incubation of 19-nor-$\Delta^4$-androstene-3,17-dione with a culture of *Curvularia lunata* ATCC 6347, by following the method of G. M. Schull et al., J. Am. Chem. Soc. 77, 763 (1955) in 100 cc. of 5% ethanolic potassium hydroxide solution was added to 500 mg. of 10% palladium on charcoal catalyst, which had been previously reduced, and the mixture was hydrogenated at room temperature and atmospheric pressure until the absorption of hydrogen ceased. The catalyst was filtered off, the filtrate concentrated to a small volume under reduced pressure, diluted with water and extracted with ethyl acetate; the extract was washed with water to neutral, dried and evaporated to dryness. Crystallization of the residue from acetone-ether gave the pure 19-nor-etiocholan-11$\beta$-ol-3,17-dione.

1 g. of the foregoing compound was dissolved with slow heating in 12.5 cc. of dimethyl-formamide, the mixture was cooled, 0.42 g. of mesyl chloride and 0.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished $\Delta^{9(11)}$-19-nor-etiocholene-3,17-dione, identical to that obtained in Example I.

Example VII

A solution of 1 g. of $\Delta^{9(11)}$-19-nor-etiocholene-3,17-dione in 60 cc. of glacial acetic acid was added to a suspension of 100 mg. of platinum oxide in 10 cc. of acetic acid, which had been previously reduced. The mixture was hydrogenated at room temperature under initial pressure of 30 pounds until 1.1 equivalents of hydrogen were absorbed, the catalyst was eliminated by filtration and the filtrate was evaporated to dryness under reduced pressure. The residue was purified by chromatography on 50 g. of neutral alumina, to produce the pure 19-nor-9$\beta$-etiocholane-3,17-dione, identical to that obtained in Example I.

Example VIII

The preceding example was repeated but using ethyl acetate as solvent, to produce also 19-nor-9$\beta$-etiocholane-3,17-dione in similar yield.

Example IX

A solution of 1 g. of $\Delta^{9(11)}$-19-nor-etiocholene-3,17-dione in 50 cc. of ethyl acetate was hydrogenated at room temperature and atmospheric pressure in the presence of 200 mg. of prereduced 10% palladium-charcoal catalyst until the absorption of hydrogen ceased. The catalyst was eliminated by filtration and the filtrate evaporated to dryness. Crystallization of the residue from acetone-ether gave 19-nor-9$\beta$-etiocholane-3,17-dione, identical to that obtained in the previous examples.

The same results were obtained when the hydrogenation was conducted at 50° C. and at an initial pressure of 30 pounds.

Example X

A mixture of 2 g. of 19-nor-9$\beta$-etiocholane-3,17-dione, 40 cc. of dioxane and 1.5 g. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in hexane and chromatographed on 100 g. of alumina, thus producing $\Delta^4$-19-nor-9$\beta$-androstene-3,17-dione and $\Delta^1$-19-nor-9$\beta$-androstene-3,17-dione in pure form.

Example XI

A mixture of 500 mg. of $\Delta^4$-19-nor-9$\beta$-androstene-3,17-dione and 20 cc. of 1% methanolic potassium hydroxide solution was refluxed for 2 hours. It was then diluted with water, extracted with methylene chloride and the organic extract washed with water to neutral, dried over anhydrous sodium sulfate and evaporated to dryness. Crystallization of the residue from acetone-hexane gave the pure $\Delta^4$-19-nor-9$\beta$,10$\alpha$-androstene-3,17-dione, identical to the product obtained in Example IV.

Example XII

A solution of 1.1 molar equivalents of bromine in 10 cc. of glacial acetic acid was added dropwise with stirring to a solution of 1 g. of 19-nor-9$\beta$-etiocholane-3,17-dione in 25 cc. of glacial acetic acid containing a few drops of hydrogen bromide in acetic acid. When the reaction mixture was completely decolorized water was added and the 4-bromo compound collected by filtration, washed well wtih water and air dried.

The above crude compound was refluxed with 1 g. of calcium carbonate and 50 cc. of dimethylformamide for 30 minutes. The mixture was filtered, the solvent evaporated under reduced pressure and the residue crystallized from acetone-hexane to afford $\Delta^4$-19-nor-9$\beta$-androstene-3,17-dione, identical to that obtained in Example X.

The foregoing compound was dehydrogenated with 2,3-dichloro-5,6-dicyano-1,4-benzoquinone, by following the method of Example X, thus yielding 9$\beta$-estrone, identical to that obtained in Example II.

Example XIII

To a solution of 5 g. of 11$\alpha$-hydroxy-19-nor-progesterone in 500 cc. of ethanol there was added 1 g. of potassium hydroxide dissolved in 20 cc. of ethanol and 500 mg. of 10% palladium on charcoal catalyst, and the mixture was hydrogenated at room temperature and atmospheric pressure until 1 molar equivalent of hydrogen was absorbed. The catalyst was filtered off and the filtrate was diluted with ethyl acetate, washed with water to neutral, dried over anhydrous sodium sulfate and evaporated under reduced pressure until crystallization started. There was thus obtained 11α-hydroxy-19-nor-pregnane-3,20-dione.

The foregoing compound was dehydrated with 2-chloro-1,1,2-trifluorotriethylamine, in accordance with the method of Example I, to produce $\Delta^{9(11)}$-19-nor-pregnene-3,20-dione, which upon hydrogenation in the presence of platinum oxide catalyst followed by oxidation with 8 N-chromic acid gave 19-nor-9β-pregnane-3,20-dione.

Example XIV

By following the method described in Example II, 5 g. of 19-nor-9β-pregnane-3,20-dione were incubated with a culture of *Corynebacterium simplex*, thus producing $\Delta^{1,3,5(10)}$-19-nor-9β-pregnatrien-3-ol-20-one.

Upon treatment of the preceding compound with dimethyl sulfate in acetone and in the presence of potassium hydroxide, there was obtained 3-methoxy-$\Delta^{1,3,5(10)}$-19-nor-9β-pregnatrien-20-one.

Example XV

A mixture of 2.5 g. of 3-methoxy-$\Delta^{1,3,5(10)}$-19-nor-9β-pregnatrien-20-one, 70 cc. of anhydrous benzene, 12.5 cc. of ethylene glycol and 125 mg. of p-toluenesulfonic acid was refluxed for 8 hours using a water separator. The resulting solution was washed with 5% sodium bicarbonate solution and with water to neutral, dried and evaporated to dryness. Crystallization from acetone-hexane gave 3-methoxy-20-ethylenedioxy-$\Delta^{1,3,5(10)}$-19-nor-9β-pregnatriene.

The foregoing compound was then reduced with lithium in liquid ammonia followed by treatment with 3 N hydrochloric acid in methanol solution, in accordance with the method of Example III, to produce 19-nor-9β,10α-progesterone identical to an authentic sample.

Example XVI

Example X was repeated but using 19-nor-9β-pregnane-3,20-dione as starting material, to produce $\Delta^4$-19-nor-9β-pregnene-3,20-dione and $\Delta^1$-19-nor-9β-pregnene-3,20-dione which were separated by chromatography on neutral alumina.

Upon treatment of $\Delta^4$-19-nor-9β-pregnene-3,20-dione with potassium hydroxide solution, in accordance with the method of Example XI there was obtained 19-nor-9β,10α-progesterone, identical to an authentic sample.

Example XVII

A cooled solution of 1 g. of 19-nor-9β,10α-progesterone in 7.5 cc. of tetrahydrofuran and 4.5 cc. of methanol was treated under continuous stirring with 1.5 g. of pure calcium oxide, in small portions, and then with 1.5 g. of iodine. The stirring was continued at room temperature until the solution turned pale yellow. The mixture was poured into ice water containing 4.5 cc. of acetic acid and 0.5 g. of sodium thiosulfate. After stirring for 15 minutes the solution was decanted and the precipitate was collected by filtration, thus giving 21-iodo-19-nor-9β,10α-progesterone. This compound was mixed with 20 cc. of acetone and 3 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding $\Delta^4$-19-nor-9β,10α-pregnen-21-ol-,3,20-dione acetate (acetate of 19-nor-9β,10α-desoxycorticosterone).

A mixture of 500 mg. of the foregoing compound, 10 cc. of methanol and 2 cc. of a 5% potassium hydroxide solution was stirred under nitrogen atmosphere for 1 hour, at 0–5° C. It was then neutralized with acetic acid and diluted with water, the formed precipitate collected by filtration, washed with water and air dried. Crystallization from methanol-water gave 19-nor-9β,10α-desoxycorticosterone.

Example XVIII

Example I was repeated but using 17,20;20,21-bis-methylenedioxy - $\Delta^4$ - 19 - nor - pregnen - 11β - ol - 3 - one, thus producing successively: 17,20;20,21-bismethylenedioxy - 19 - nor - pregnan - 11β - ol - 3 - one, $\Delta^{9(11)}$-17,20;20,21 - bismethylenedioxy - 19 - nor - pregnen-11β-ol-3-one, and 17,20;20,21-bismethylenedioxy-19-nor-9β-pregnan-3-one.

The last mentioned compound was dehydrogenated by incubation with a culture of *Corynebacterium simplex*, by following the method of Example II, to produce 17,20;20,21 - bismethylenedioxy - $\Delta^{1,3,5(10)}$ - 19-nor-9β-pregnatrien-3-ol.

Example XIX

By following the method of Example III, 1 g. of 17,20;20,21 - bismethylenedioxy - $\Delta^{1,3,5(10)}$ - 19 - nor - 9β - pregnatrien-3-ol was converted into its 3-methyl ether, which upon reduction with lithium in liquid ammonia followed by acid treatment gave 17,20;20,21-bismethylenedioxy-$\Delta^4$-19-nor-9β,10α-pregnen-3-one.

A mixture of 200 mg. of the preceding compound and 5 cc. of 60% formic acid was heated on the steam bath for 1 hour, cooled, diluted with water and extracted with methylene chloride. The extract was washed to neutral, dried over anhydrous sodium sulfate and evaporated to dryness. The residue was crystallized from acetone-ether, to produce $\Delta^4$-19-nor-9β,10α-pregnene-17α, 21-diol-3,20-dione.

I claim:

1. In the process for producing 19-nor-9β,10α-steroid compounds selected from the group consisting of the androstane and pregnane series the step which comprises catalytically hydrogenating a 19-nor-$\Delta^{9(11)}$-3-keto steroid compound selected from the group consisting of the etiocholane and 5β-pregnane series, in a suitable solvent, to produce the saturated compound having the hydrogen atom at C–9 in β-configuration.

2. The process of claim 1 wherein the catalyst used is platinum oxide.

3. The process of claim 1 wherein the catalyst used is a palladium on charcoal catalyst.

4. The process of claim 2 wherein the solvent used is acetic acid.

5. The process of claim 2 wherein the solvent used is ethyl acetate.

6. In the process for producing 19-nor-9β,10α-testosterone, the step which comprises hydrogenating 19-nor-$\Delta^{9(11)}$-etiocholane-3,17-dione in the presence of platinum oxide catalyst, in a suitable organic solvent.

7. In the process for producing 19-nor-9β,10α-progesterone, the step which comprises hydrogenating 19-nor-$\Delta^{9(11)}$-pregnene-3,20-dione in the presence of platinum-oxide catalyst, in a suitable organic solvent.

References Cited by the Examiner

Snatzke et al.: "Annales der Chemie," Justus Liebigs, volume 676, August 1964, page 217 relied on.

LEWIS GOTTS, *Primary Examiner.*

ELBERT L. ROBERTS, *Assistant Examiner.*